(12) United States Patent
Xu et al.

(10) Patent No.: US 7,439,491 B2
(45) Date of Patent: Oct. 21, 2008

(54) ERROR REDUCTION FOR IMAGE CAPTURING DEVICE

(75) Inventors: Jianhua Xu, Mill Creek, WA (US); Frank Blaine Metting, III, Bothell, WA (US); Gregory T. Gibson, Snohomish, WA (US); Richard A. James, Woodinville, WA (US)

(73) Assignee: Microvision, Inc., Redmond, WA (US)

( * ) Notice: Subject to any disclaimer, the term of this patent is extended or adjusted under 35 U.S.C. 154(b) by 242 days.

(21) Appl. No.: 11/428,450

(22) Filed: Jul. 3, 2006

(65) Prior Publication Data

US 2008/0001060 A1 Jan. 3, 2008

(51) Int. Cl.
*H01J 3/14* (2006.01)
*G01B 9/00* (2006.01)

(52) U.S. Cl. ........................................ 250/234; 356/124

(58) Field of Classification Search ................. 250/234, 250/235, 252.1, 208.1, 216; 356/124, 239.2
See application file for complete search history.

(56) References Cited

U.S. PATENT DOCUMENTS

| 5,569,900 A * | 10/1996 | Blohbaum | 235/462.28 |
| 2005/0179959 A1* | 8/2005 | Lien | 358/406 |
| 2007/0081168 A1* | 4/2007 | Johnston | 356/614 |

\* cited by examiner

*Primary Examiner*—Thanh X Luu
(74) *Attorney, Agent, or Firm*—Kevin D. Wills

(57) ABSTRACT

Aspects of the subject matter described herein relate to reducing error in images obtained from an image-acquiring system. An image-acquiring system may be modeled as light received from a primary path, light received from a secondary path, and light received from all other paths. Light received from the secondary and other paths may cause error in images captured by the image-acquiring system. By compensating for this light, the error may be reduced. Other aspects are described in the specification.

15 Claims, 8 Drawing Sheets

US 7,439,491 B2

ERROR REDUCTION FOR IMAGE CAPTURING DEVICE

SUMMARY

Briefly, aspects of the subject matter described herein relate to reducing error in images obtained from an image-acquiring system. An image-acquiring system may be modeled as light received from a primary path, light received from a secondary path, and light received from all other paths. Light received from the secondary and other paths may cause error in images captured by the image-acquiring system. By compensating for this light, the error may be reduced.

This Summary is provided to briefly identify aspects of the subject matter described herein that are further described below in the Detailed Description. This Summary is not intended to identify key or essential features of the claimed subject matter, nor is it intended to be used to limit the scope of the claimed subject matter.

DETAILED DESCRIPTION

The phrase "subject matter described herein" refers to subject matter described in the Detailed Description unless the context clearly indicates otherwise. The term "includes" should be read as "includes, but is not limited to" unless the context clearly indicates otherwise. The term "or" is an inclusive "or" operator, and is equivalent to the term "and/or," unless the context clearly dictates otherwise. The term "an embodiment" should be read as "at least one embodiment." The term "another embodiment" should be read as "at least one other embodiment." The term "aspects" when used by itself is short for "aspects of the subject matter described herein." The phrase "aspects of the subject matter described herein" should be read as "at least one feature of at least one embodiment." Identifying aspects of the subject matter described in the Detailed Description is not intended to identify key or essential features of the claimed subject matter.

Flow diagrams are depicted in some figures below. In an embodiment, actions associated with the flow diagrams occur in an order corresponding to the flow diagrams. In other embodiments, actions are constrained only by the order in which results are required and may occur in other orders or in parallel, depending upon implementation. It will be recognized by those skilled in the art that alternative actions may be substituted for actions described herein to achieve the same function or that some actions may be omitted or changed to provide the same functionality without departing from the spirit or scope of the subject matter described herein.

Figure 1:
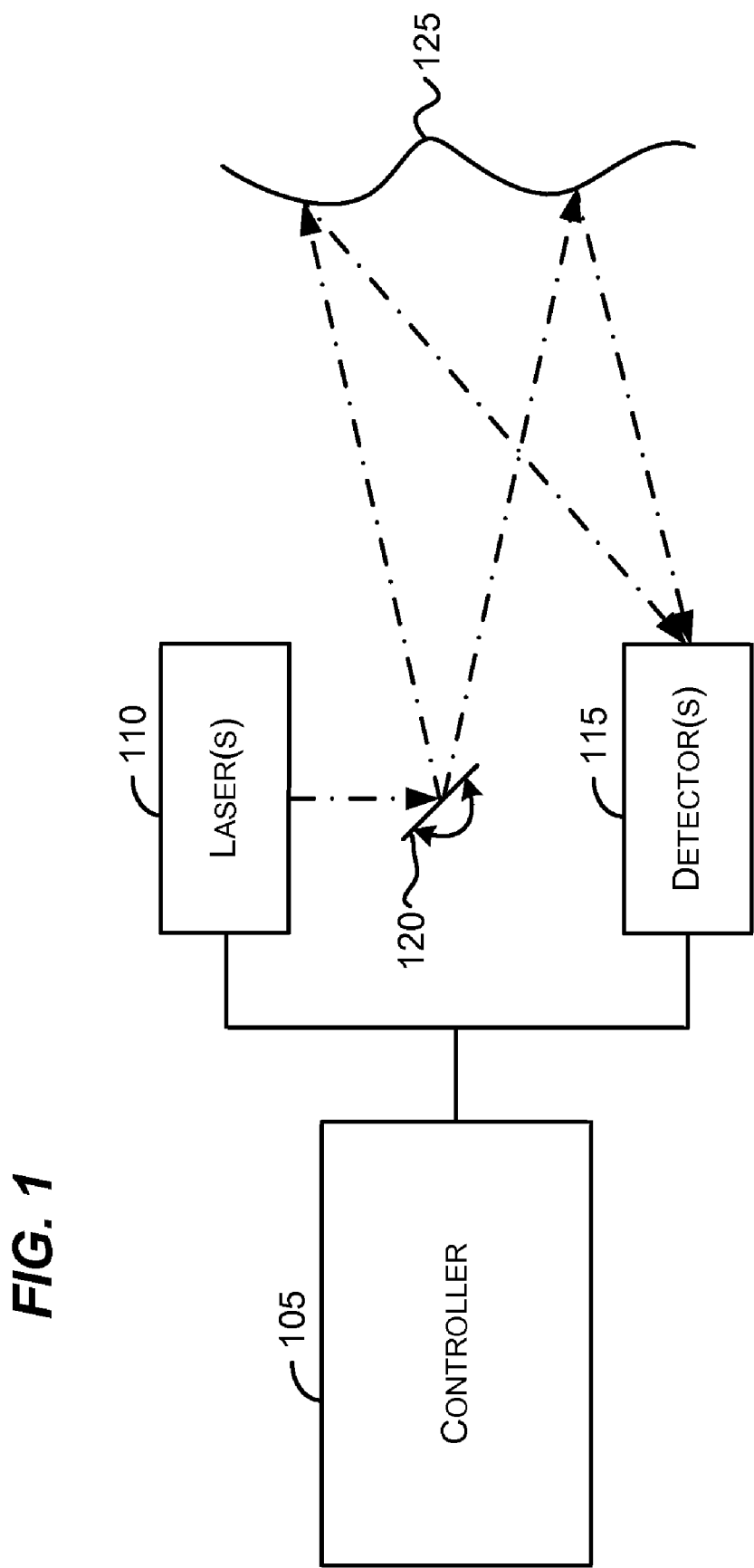
FIG. 1 is a diagram that represents a scanned-beam system according to an embodiment.

FIG. 1 is a diagram that represents a scanned-beam system according to an embodiment. The system includes a controller 105 coupled to one or more lasers 110, one or more detectors 115, and one or more laser directing elements 120. In an embodiment, the controller 105 may vary the intensity of the lasers 110 as well as the sensitivity of the detectors 115. In addition, the controller 105 may control the laser directing elements 120 to cause the light generated from the lasers 110 to be sent to various locations of a scanning area 125. In some embodiments, the laser directing elements 120 may oscillate at a known or selectable frequency. In such embodiments, the controller 105 may direct the light from the lasers 110 via the laser directing elements 120 by controlling when the lasers 110 emit light. Light that reflects from the scanning area 125 may be detected by the detectors 115. The detectors 115 may generate data or signals (hereinafter "data") regarding the light reflected from the scanning area 125 that is sent back to the controller 105. This data may be used to generate an image frame that corresponds to the scanning area 125.

Images may be detected at a specified or selected frame rate. For example, in an embodiment, an image is detected and converted into a frame 30 times per second.

In accordance with the subject matter described herein, in some embodiments, light comprises visible light. In other embodiments light comprises any radiation detectable by the detectors 115 and may include any combination of infrared, ultraviolet, radio, gamma waves, x-rays, and radiation of other frequencies in the electromagnetic spectrum.

The controller 105 may comprise one or more application-specific integrated circuits (ASICs), discrete components, embedded controllers, general or special purpose processors, any combination of the above, and the like. In some embodiments, the functions of the controller 105 may be performed by various components. For example, the controller may include hardware components that interface with the lasers 110 and the detectors 115, hardware components (e.g., such as a processor or ASIC) that performs calculations based on received data, and software components (e.g., software, firmware, circuit structures, and the like) which a processor or the like executes to perform calculations. These components may be included on a single device or distributed across more than one device without departing from the spirit or scope of the subject matter described herein.

The software components may be stored on any available machine-readable media accessible by the controller 105 and may include both volatile and nonvolatile media and removable and non-removable media. By way of example, and not limitation, machine-readable media may comprise storage media and communication media. Storage media includes both volatile and nonvolatile, removable and non-removable media implemented in any method or technology for storage of information such as machine-readable instructions, data structures, program modules, or other data. Storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the controller 105. Communication media typically embodies machine-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of machine-readable media.

In an embodiment, at least part of the scanned-beam system is part of a camera, video recorder, document scanner, other image capturing device, or the like. In an embodiment, the scanned-beam system may comprise a microelectromechanical (MEMS) scanner that operates in a progressive or bi-sinusoidal scan pattern. In other embodiments, the scanned-beam system may comprise a scanner having electrical, mechanical, optical, fluid, other components, any combination thereof, or the like that is capable of directing light in a pattern.

Figure 2:
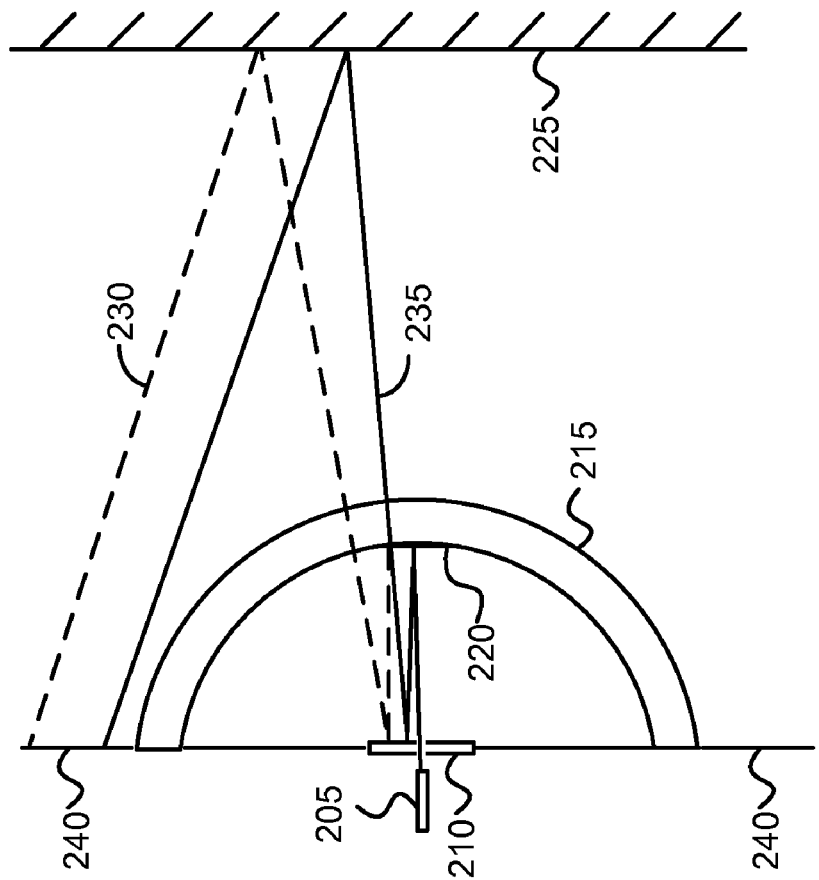
FIG. 2 is a diagram that generally represents components of an exemplary scanned-beam system according to an embodiment.

FIG. 2 is a diagram that generally represents components of an exemplary scanned-beam system according to an embodiment. The components include a light emitter 205, a light directing element 210, a lens 215, and detectors 240.

The light emitter 205 may comprise an optical fiber that channels light from a light source (e.g., such as the laser(s) 110 of FIG. 1) to a hole in the light directing element 210. The light directing element 210 may comprise a mirror with mechanisms to have its orientation varied to cause light to be directed to different portions of the surface 225 similar to the laser directing element 120 of FIG. 1. The lens 215 may comprise a meniscus lens and may be coated with an anti-reflective coating that tends to eliminate reflections and may be transparent to light in a selected spectrum while opaque to light in other spectrums. The detectors 240 may comprise a bundle of optical fiber, light detecting silicon structure, positive intrinsic negative (PIN) diodes, avalanche photo diodes (APDs), photomultiplier tubes, or other light detecting elements. In an embodiment, the detectors 240 may comprise non-imaging detectors. That is, the detectors 240 may operate without the use of a lens, pin hole, or other optical device that creates an image from the detected light on a conjugate image plane.

The detectors 240 may be connected to a circuit that measures the amount and type of light received by the detectors 240. In an embodiment, the ends of the detectors 240 lie in a plane parallel to a plane of the light directing element 210 (as shown). In other embodiments, the ends of the light detectors 240 may be placed above or below the plane of the light directing element 210 or in other locations. A mirror 220 that allows some or no light to pass through it may be placed or constructed on the lens 215 to reflect light back to the light directing element 210.

In operation, light from the light emitter 205 passes through the hole in the light directing element 210 to the mirror 220 which reflects all or part of the light back to the light directing element 210. Depending on the orientation of the light directing element, at least some of the light travels through the lens 215 along a path represented by the solid line 235. Part of the light may reflect from the lens 215 and follow another path represented by the dashed line 230. Part of the light traveling along the dashed line 230 may reflect and follow yet another path (not shown) as the light contacts the edges of the lens 215 or encounters dust or other particles. Indeed many other reflections (not shown) may occur as the light travels towards the detectors 240.

As the light directing element 210 changes orientation, the light may be reflected to various places on the surface 225. By determining the orientation of the light directing element 210 and measuring the light detected by the light detectors 240, an image of pixels may be constructed with each pixel corresponding to the light received by the detectors while the light directing element 210 was directing the primary path of light to a particular region of the surface 225. The light detected by the light detectors 240 and used to create a pixel may also include light from paths other than the primary path. Light received from other paths may form an error in the image. In an embodiment, the light reflecting from other paths may superimpose on the final image an image similar to the surface of the light directing element 210 and the area surrounding the light directing element 210. With sufficient gain, even when a scanned-beam system is scanning an object a long way away, the type of error image described above may occur.

Figure 3:
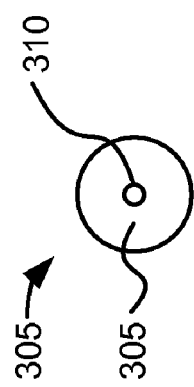
FIG. 3 is a diagram representing an exemplary light directing element according to an embodiment.

In an embodiment, a light directing element may comprise a structure similar to that shown in FIG. 3. The light directing element 305 may include a reflective surface 305 and a hole 310 through which light may pass. When such a light directing element is used in a scanned-beam system, an error image having a dark portion in a circle in the middle surrounded by a light portion around the dark circle, followed by a dark portion surrounding the light portion may be superimposed on the image. Other light directing elements and other scanned beam systems may have a different error image superimposed on the image depending on implementation.

Figure 4:
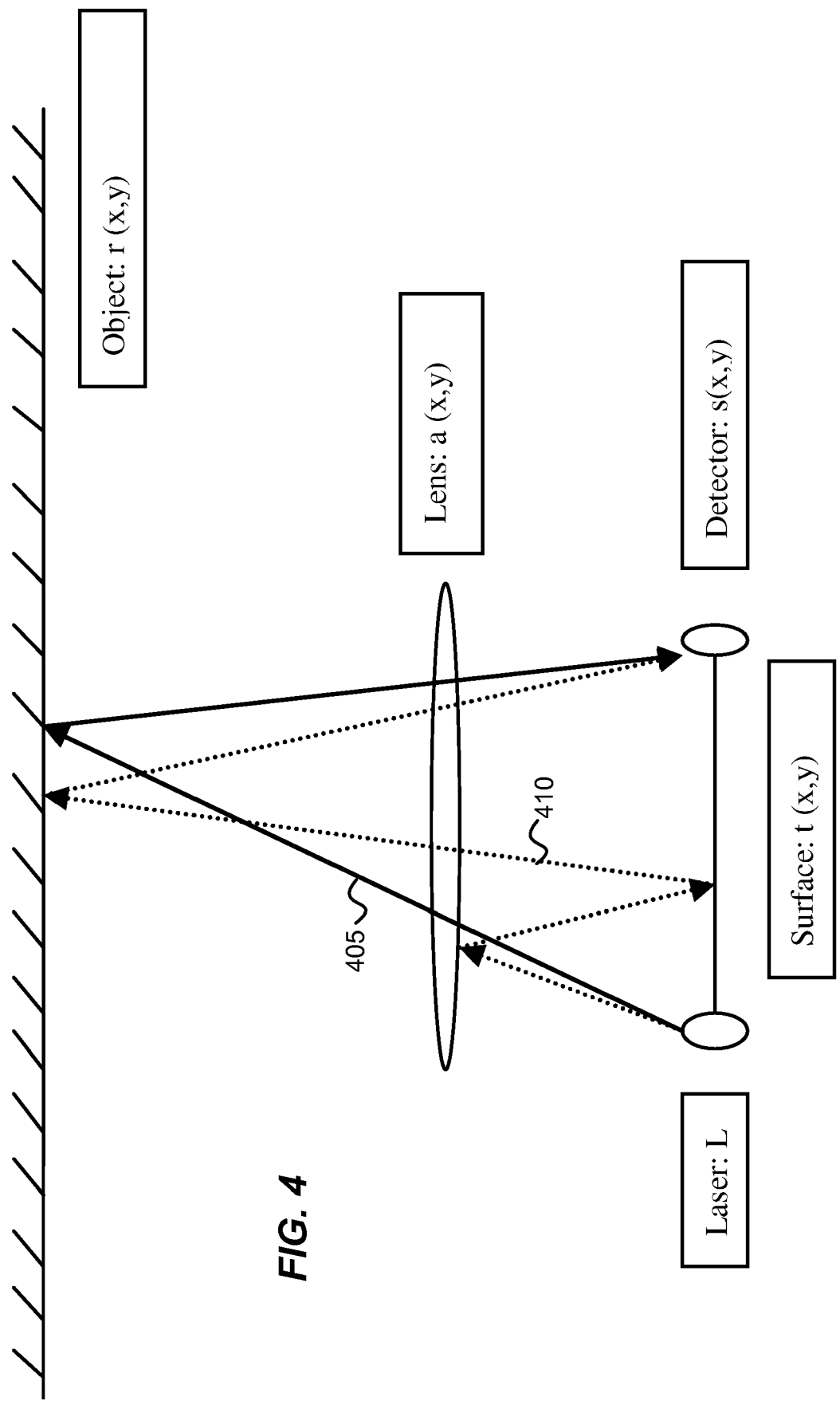
FIG. 4 is a diagram representing a model of a scanned-beam system according to an embodiment.

FIG. 4 is a diagram representing a model of a scanned-beam system according to an embodiment. A primary path 405 and a secondary path 410 in which light travels are shown but there may also be many other paths (not shown) caused by other reflections. An object may have a reflectance $r(x, y)$, a lens may have a reflectance $a(x, y)$, and a surface of a light directing element of a scanned-beam system and its surroundings may have a reflectance $t(x, y)$, where x and y correspond to coordinates to which light is directed.

In general, reflectance varies from no reflectance (i.e., no light reflects from the surface) to partial reflectance (i.e., some light reflects from the surface) to total reflectance (i.e., all light reflects from the surface). If zero represents no reflectance and one represents total reflectance, the reflectance of the object, lens, and light directing element and its surroundings will satisfy the following properties:

$0.0 <= r(x, y) <= 1.0$;
$0.0 <= a(x, y) <= 1.0$; and
$0.0 <= t(x, y) <= 1.0$

The signal or light received by the detector may be modeled as the light received from the primary path, the light received from the secondary path, and the light received from all other paths. Furthermore, the intensity of the laser (or other light source) or gain of the detectors may be modeled as L. Let $s1(x, y)$ equal the light received from the primary path 405, $s2(x, y)$ equal the light received from the secondary path 410, and $B(x, y)$ equal the light received from all other paths. Also, let $s(x, y)$ equal the total light received at the detectors. Then $$s1(x, y) = L * r(x, y)$$

$$s2(x, y) = L * a(x, y) * t(x, y) * r(x, y)$$

-continued $$s1(x, y) + s2(x, y) = L*r(x, y) + L*a(x, y)*t(x, y)*r(x, y)$$
$$= L*r(x, y)*\{1.0 + a(x, y)*t(x, y)\}$$

In an embodiment, the light received from all other paths may be assumed to correspond to a constant denoted by B. Furthermore, a(x, y) may be assumed to be approximately constant over x and y and may be denoted by A. The total light received by the detectors (i.e., s(x, y)), is then $$s(x,y)=L*r(x,y)*\{1.0+A*t(x,y)+B\} \quad (1)$$

Taking the log of both sides of (1) yields:

$$\log\{s(x,y)\}=\log\{L*r(x,y)\}+\log\{1.0+A*t(x,y)+B\} \quad (2)$$

Rearranging in terms of r(x, y) yields:

$$r(x,y)=\exp\{\log[s(x,y)]-\log[1.0+A*t(x,y)+B]\}/L \quad (3)$$

In (3), there are several unknowns, including r(x, y), A, t(x, y), B, and L. If the values for 4 of the unknowns are determined, the value of the other unknown may also be determined. In particular, if A, t(x, y), B, and L are determined, then r(x, y) may also be determined. With r(x, y), an image that closely corresponds to the scanned object may be determined as s1(x, y)=L*r(x, y).

The reflectance t(x, y) may be found by calibrating the scanned-beam system with images captured from a white paper or some other surface with reflectance close to one. To do this, the scanned-beam system may be placed at various distances from the paper and images obtained to obtain an average image corresponding to t(x, y).

Figure 5:
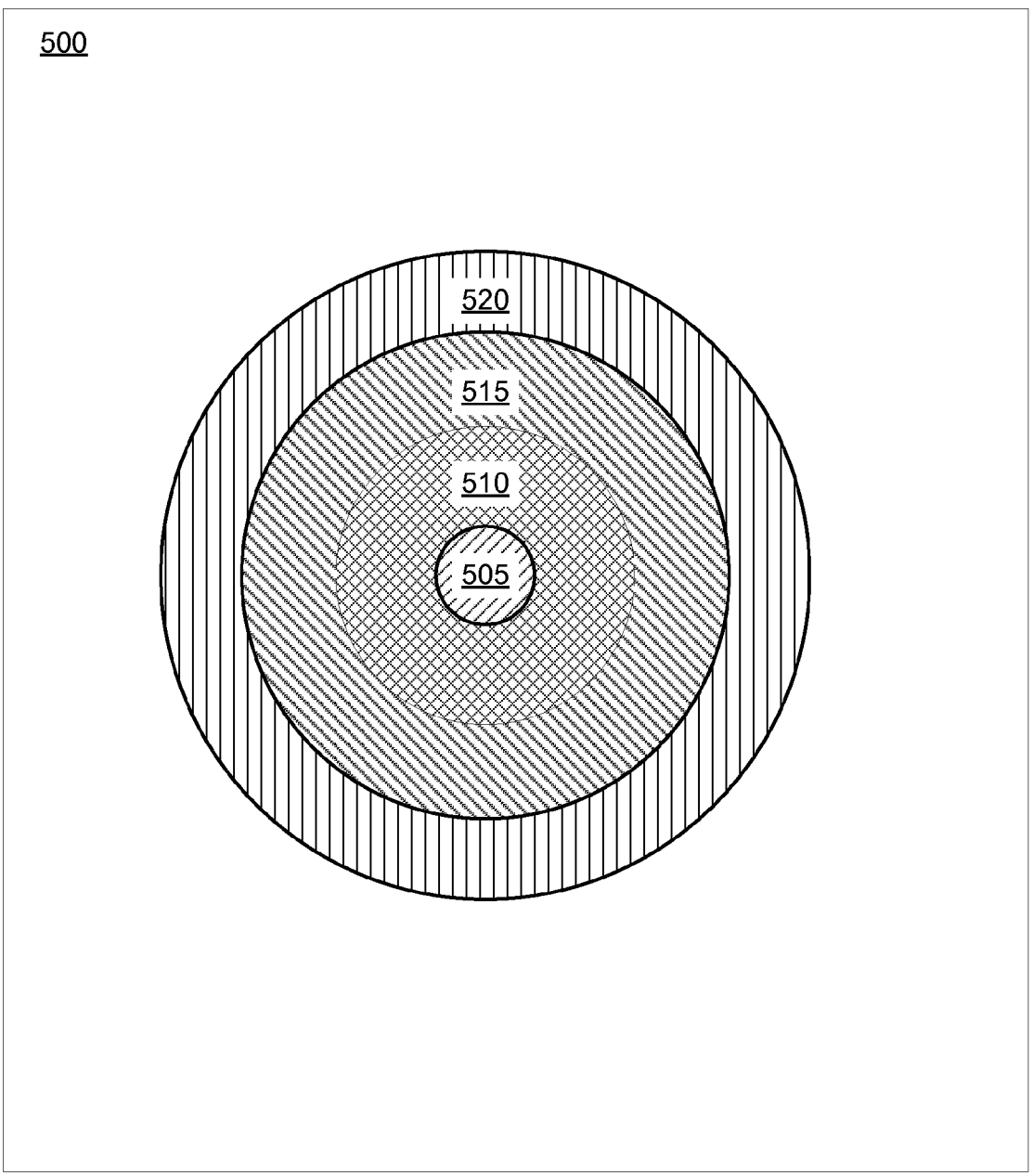
FIG. 5 is a diagram representing an average image captured by a scanned-beam system by placing the scanned-beam system at various distances from a sheet of white paper according to an embodiment.

FIG. 5 is a diagram representing an average image captured by a scanned-beam system by placing the scanned-beam system at various distances from a sheet of white paper according to an embodiment. The average image 500 (not drawn to scale) has some features in common with the light directing element 305 of FIG. 3. The average image 500 may include various portions 505, 510, 515, and 520. In an embodiment, portion 505 is relatively dark and corresponds to the hole 310 of the light directing element 305 of FIG. 3. The portion 510 is lighter than the portion 505. The portion 515 is bright with respect to the other portions and may be caused by light that reflects from the reflective surface 305 of FIG. 3. The portion 520 may be relatively dark and may be caused as less light reflects from the other dark structure surrounding the reflective surface of the light directing element. The average image 500 may be used to calculate t(x, y).

Scanned-beam systems with a different light directing element may generate a different average image than that shown in FIG. 5. For these other scanned-beam systems, the average image obtained by capturing images for a sheet of white paper or other reflective surface may be used to calculate t(x, y).

The characteristics of the light directing element may also be used to determine A and B. Because of the error introduced by the light directing element, some of the areas of the image may receive more light than they would without the error. For example, light in the secondary path that reflects from the mirror of the light directing element may cause a great deal of light to reach the surface which is then reflected back to the detectors. On the other hand, other light directed from the light directing element may not reach the surface in a secondary path. For example, light that reflects back into the hole of a light directing element may not reach the surface. To find A and B, an area of the image may be found that receives a greater amount of light along the secondary or greater paths from the light directing element and the brightness of this area may be compared with the brightness of another area that does not receive a great deal of light along the secondary or greater paths. A and B may then be adjusted until the difference between the brightness is less than a threshold as described below. Because A multiples t(x, y), adjusting A does not necessarily affect the brightness associated with B.

In an embodiment, increasing A or B causes r(x, y) to decrease which causes a darker image. Decreasing L, on the other hand, causes a brighter image. By adjusting A, B, and L as described below, the error due to the light directing element may be reduced.

For example, the unknown A may be determined or approximated by comparing two areas of the detected image and increasing or decreasing A until the difference between the average grey scale levels of the two areas is less than a threshold. In an embodiment, the two areas that are compared are the portion of the detected image corresponding to the reflective portion of the light directing element and the portion of the detected image corresponding to an area immediately surrounding the reflective portion of the light directing element. The area immediately surrounding the reflective portion of the light directing element may correspond to a background which is darker than area corresponding to the reflective portion of the light directing element. Referring to FIG. 5, two suitable portions include the portion 515 and the portion 520. By starting with an initial value of A and then increasing or decreasing A until the difference between the average grey scale levels of the outer two portions of the image corresponding to the light directing element is less than a threshold, error associated with light reflecting through the secondary path may be reduced.

The unknown B may be determined by comparing the ratio of the average grey scale levels of two areas of the detected image and increasing B until the ratio is less than a threshold. If the ratio is greater than a threshold, B may be increased until the ratio is less than or equal to the threshold. B may be initially set to 0.

One of the areas used in calculating B may include a portion of the detected image that is relatively free from light obtained from the secondary path. In an embodiment, this area may include a central portion corresponding to the hole of the light directing element. Referring to FIG. 2, light that is reflected back into the hole of the light directing element 210 may not reach the detectors 240. Referring to FIG. 5, this lack of light corresponds to the relatively dark portion 505. The other area that may be selected is the lightest portion of the image corresponding to the reflective surface of the light directing element. Referring to FIG. 5, this portion may include the portion 515.

L may also be increased or decreased as A and B are decreased or increased so that the image does not become too dark or too bright. Adjusting L may also help to maintain a substantially constant contrast in the image as A and B are adjusted.

Figure 6:
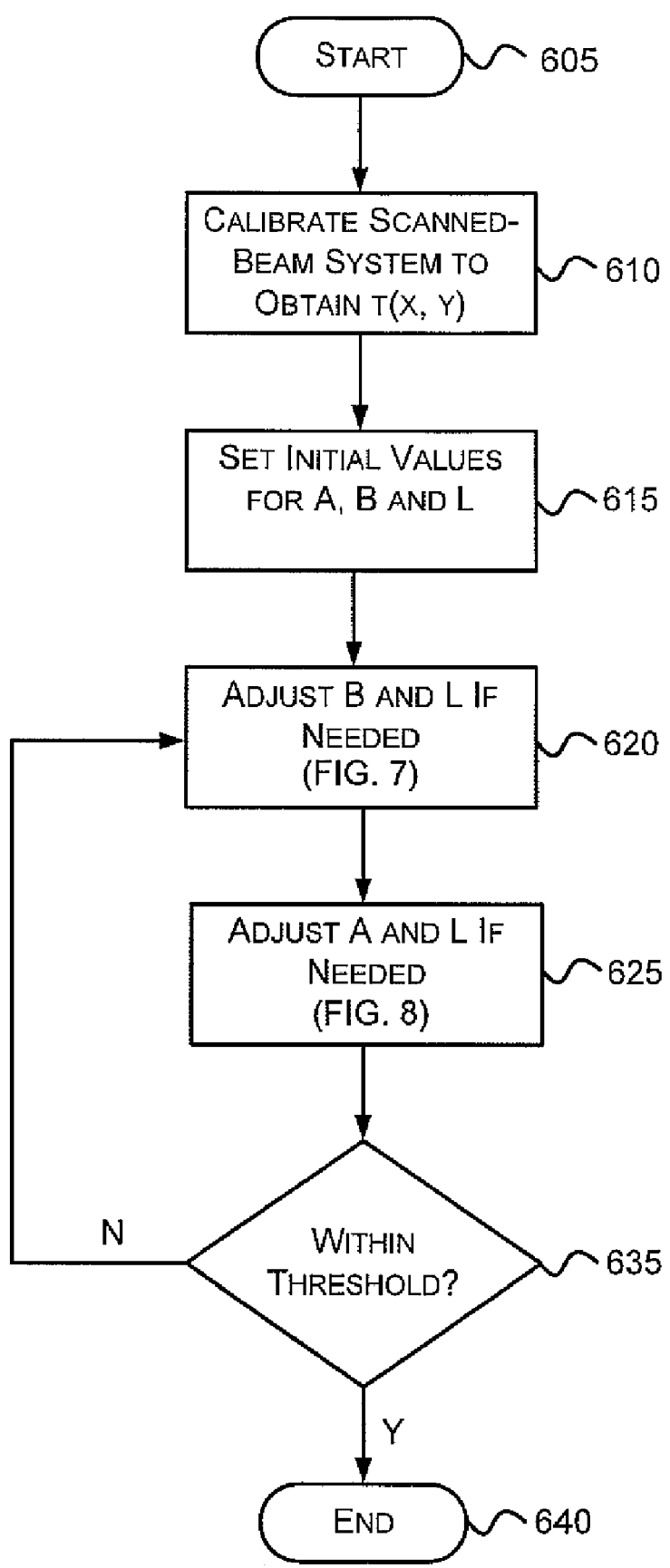
FIG. 6 is a flow diagram that generally represents actions that may occur in reducing error in an image according to an embodiment.

FIG. 6 is a flow diagram that generally represents actions that may occur in reducing error in an image according to an embodiment. At block 605, the actions begin.

At block 610, the scanned beam system is calibrated to obtain t(x, y). As mentioned previously, this may be done by scanning a white surface. In an embodiment, the white surface is scanned from various distances and the images obtained therefrom are averaged. In another embodiment, the white surface may be scanned at various distances to provide one or more t(x, y)'s. When calculating an r(x, y), the t(x, y) associated with the closest distance to the distance to the current object may be used. The one or more images corresponding to t(x, y) may be saved for future reference. Thereafter, the saved images may be used to obtain t(x, y).

At block 615, initial values for A, B, and L may be set. In an embodiment, A, B, and L are initially set to zero and adjusted later as needed. In another embodiment, InOutAve is determined (as described below in conjunction with FIG. 8), and the initial values of A and L are set depending on the value of InOutAve. For example, in an embodiment, A and L may be set as follows:

```
If (Th(i-1 )=<InOutAve<Th(i)){
    A0 = A0(i);
    L0 = L0(i);
}
( i = 1,2,..., 5)
where:
    Th(0) =0.0, n=5;
    {Th(1),A0(1), L0(1)} = { 3000, 0.2, 0.8 },
    {Th(2),A0(2), L0(2)} = { 6000, 1.0, 0.6 },
    {Th(3),A0(3), L0(3)} = { 7000, 2.5, 0.4 },
    {Th(4),A0(4), L0(4)} = { 8000, 4.0, 0.3 },
    {Th(5),A0(5), L0(5)} = { 9000, 5.0, 0.2 }; and
If (InOutAve(0)>=Th(5)){
    A0 = 15.0;
    L0 = 0.1;
}
```

Thus, if InOutAve is 7500, then the initial values of A and L are set to 2.5 and 0.4. Other initial values may be determined depending on implementation including image resolution and number of gray scale levels without departing from the spirit or scope of the subject matter described herein.

When used as part of an imaging system that is continuously scanning (e.g., a scanned beam system used to obtain live or recorded video), the initial values, if initially set, may be set when the scanned beam system is turned on and may thereafter not be reset to the initial value for each frame. Instead, each subsequent frame may use the values of A, B, and L that existed at the end of processing a previous frame.

Figure 7:
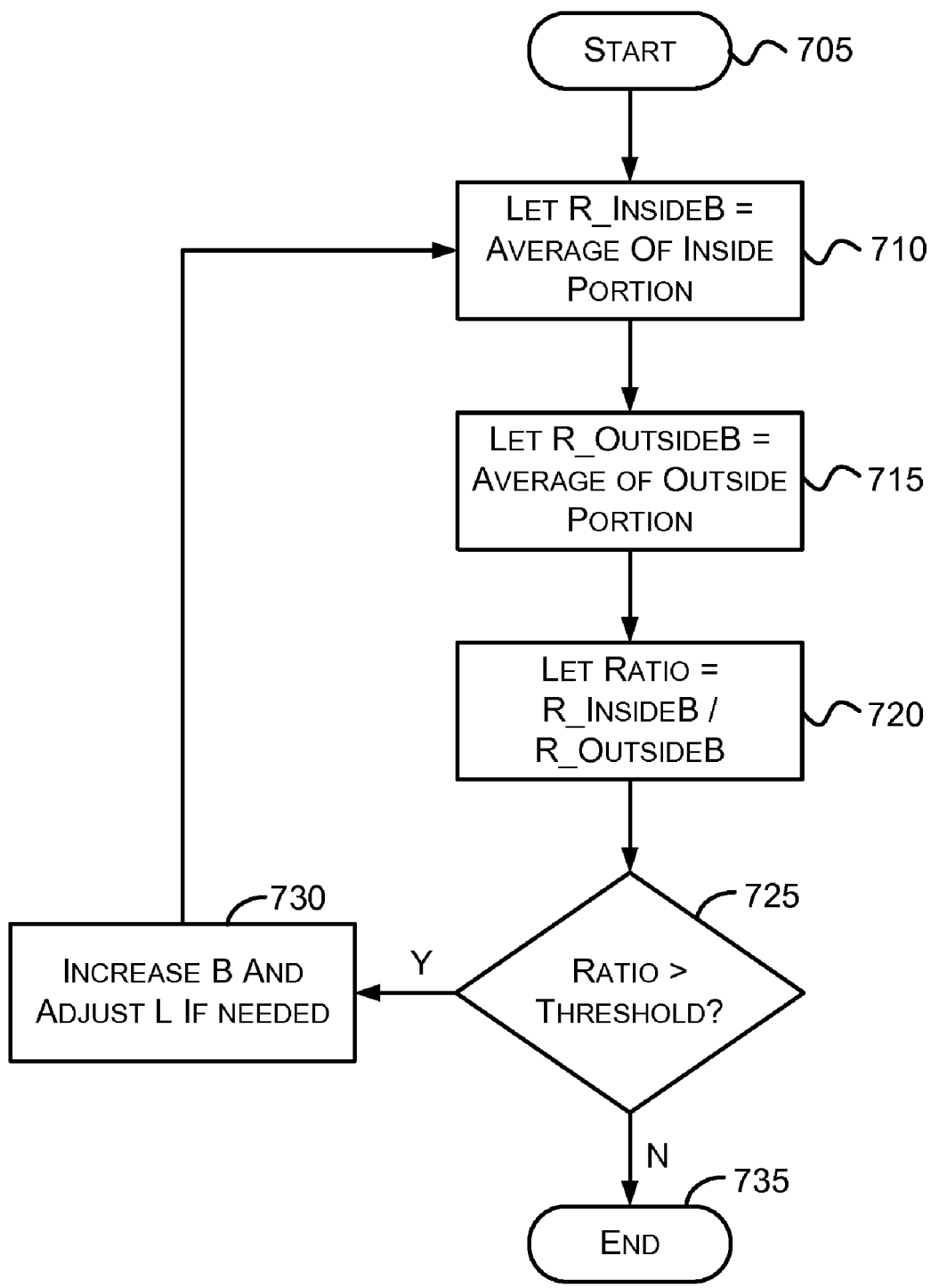
FIG. 7 is a flow diagram that generally represents actions corresponding to block 620 of FIG. 6 that may occur in adjusting the values B and L according to an embodiment.

At block 620, the B and L values are adjusted if needed as described in more detail in conjunction with FIG. 7. At block 625, the A and L values are adjusted if needed as described in more detail in conjunction with FIG. 8.

At block 635, a determination is made as to whether A, B, and L create an image that is within a threshold as described previously. If so, the action end at block 640; otherwise, the actions continue at block 620. In an embodiment, A, B, and L are within the threshold if none were adjusted in the most recent actions associated with blocks 620-630. The loop formed by blocks 620-635 may also be exited to block 640 if the number of times the loop is executed equals or exceeds a selected or predetermined number. For example, in situations with tight time constraints (e.g., a live video recording), it may be desirable to execute the loop at most 20 times.

The actions associated with blocks 620-635 may be repeated one or more times each time a scanned beam system obtains another image.

FIG. 7 is a flow diagram that generally represents actions corresponding to block 620 of FIG. 6 that may occur in adjusting the values B and L according to an embodiment. At block 705, the actions begin.

At block 710, a variable (e.g., R_InsideB) is set equal to the average grey scale image level of an inside portion of the image corresponding to the light directing element of the scanned beam system. The part of the image selected may correspond to an area which is very likely to receive little if any light from a secondary (or greater) path. For the light directing element depicted in FIGS. 2 and 3, one such area, referring to FIG. 5, is the portion 505. In implementations having a similar light directing element, R_InsideB may be set equal to the average grey scale image level of the portion 505. In other implementations, R_InsideB may be set equal to the average grey scale image of another suitable portion.

At block 715, a variable (e.g., R_OutsideB) is set equal to the average grey scale image level of another portion of the image corresponding to the light directing element of the scanned beam system. The portion selected may include that portion of the light directing element from which the most light from secondary (and higher) paths is received. For example, referring to FIG. 5, R_OutsideB may be set equal to the average gray scale image level of the portion 515.

At block 720, the ratio of the variables (e.g., R_InsideB/R_OutsideB) is calculated. At block 725, if the ratio is greater than a threshold, the actions continue at block 730; otherwise, the actions continue at block 735. In an embodiment, a suitable threshold is 1.1. Once the ratio decreases below the threshold, the threshold is set to a higher value until the ratio exceeds the higher value at which point the threshold is again set to the original threshold. Adjustments to A or L in iterations of the loop described in conjunction with FIG. 6 may cause the ratio to increase, for example. In an embodiment, the higher value used is 1.4.

At block 730, B is increased and L is adjusted if needed. In an embodiment, B is increased by 0.1. Other values for B may also be selected without departing from the spirit or scope of the subject matter described herein. Choosing a higher value of B may cause a faster convergence but selecting a much higher value of B may cause an instability which leads to slower convergence or even non-convergence. Choosing a lower value of B may cause slower convergence but may avoid instability caused by a higher value. It will be recognized that B may be selected based on the characteristics of the scanned beam system.

L may be adjusted as B is increased. If the InOutAve is less than a threshold, L may be decreased. If the InOutAve is greater than a threshold, L may be increased. If L is adjusted to be less than a minimum value, L may be set to the minimum value. In an embodiment having a 16 bit grey scale image, L may be increased or decreased by 0.025 each time it is adjusted.

At block 735, the actions end. The actions described in conjunction with FIG. 7 may be repeated as iterative attempts to determine appropriate A, B, and L values occur.

Figure 8:
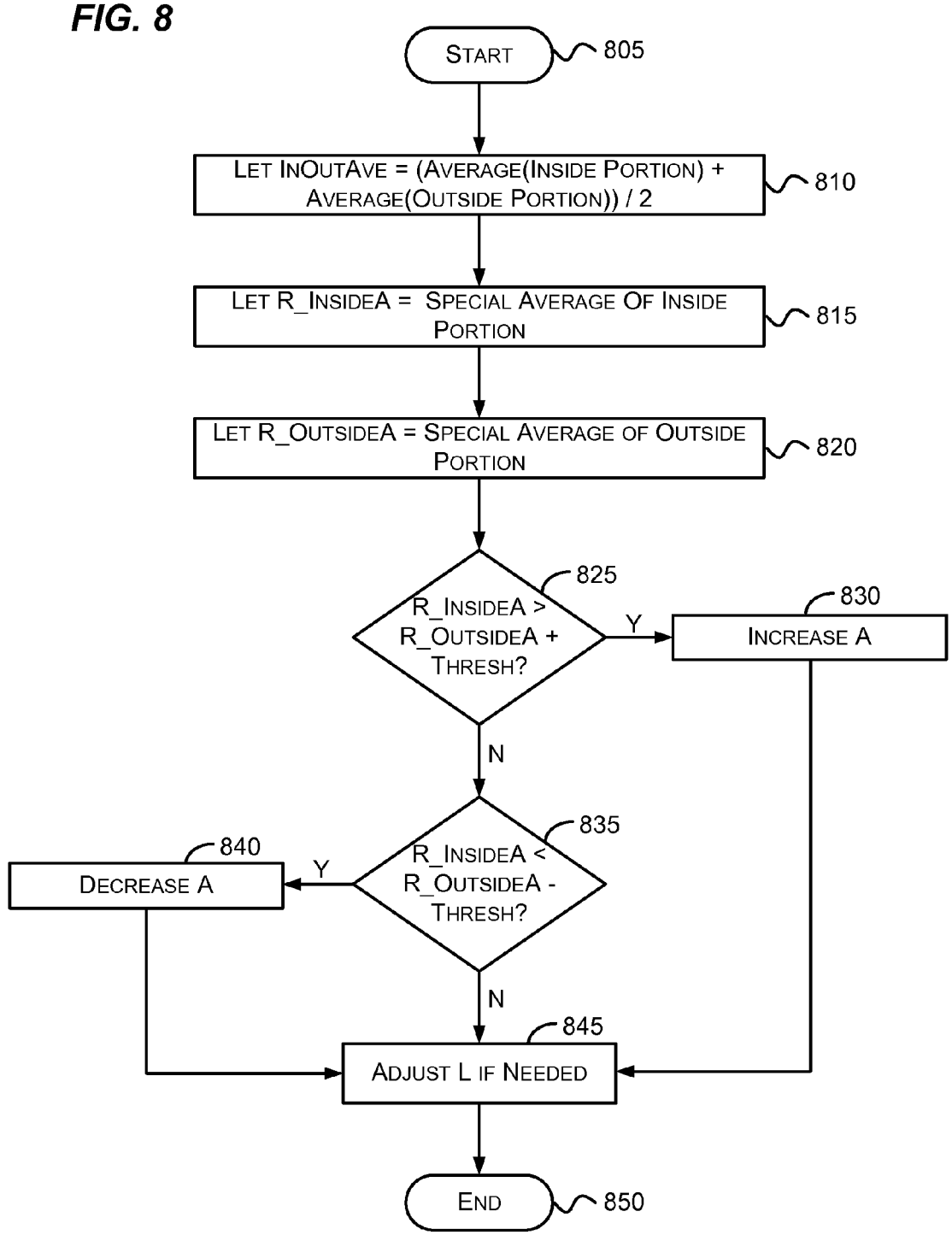
FIG. 8 is a flow diagram that generally represents actions corresponding to block 625 of FIG. 6 that may occur in adjusting the values of A and L according to an embodiment.

FIG. 8 is a flow diagram that generally represents actions corresponding to block 625 of FIG. 6 that may occur in adjusting the values of A and L according to an embodiment. At block 705, the actions begin.

At block 810, the average of the grey scale levels of two portions of the image is determined. One of the areas (e.g., an outer area) may correspond to an area within the image containing relatively less light from the secondary (or greater) paths. Another of the areas (e.g., an inner area) may correspond to an area within the image containing relatively more light from the secondary (or greater) paths. In an embodiment, one area corresponds to the portion 515 of FIG. 5 while the other area corresponds to the portion 520 of FIG. 5. A variable (e.g., InOutAve) may be assigned to the average of the two portions.

At block 815, a special average of one of the areas (e.g., the inside area) is determined. This special average may be computed by averaging all pixels within the area that have a grey scale level within a threshold of the InOutAve. An exemplary formula for computing this special average is:

$$R\_InsideA = \text{Average of } \{ \text{frame}[i][j] \mid \\ \text{if } (abs(\text{frame}[i][j] - InOutAve) < Th\_Range); (i, j) \in \text{inside area} \};$$

where frame[i][j] corresponds to pixels within the image, abs is an absolute function, and Th_Range is the threshold. For a 16 bit image, one exemplary threshold is 16,384. Not including pixels that are significantly different than the InOutAve may be done to preserve features of objects that lie within the area. Otherwise, the determinations described above may be too sensitive to different types of objects.

At block 820, a special average of another of the areas (e.g., the outside area) is determined. Again, this special average may be computed by averaging all pixels within the area that have a grey scale level within a threshold of the InOutAve. An exemplary formula for computing this special average is:

$$R\_OutsideA = \text{Average of } \{ \text{frame}[i][j] \mid \\ \text{if } (abs(\text{frame}[i][j] - InOutAve) < Th\_Range); (i,j) \in \text{outside area} \};$$

where frame[i][j] corresponds to pixels within the image, abs is an absolute function, and Th_Range is the threshold.

At block 825, a determination is made as to whether R_InsideA is greater than R_OutsideA plus a threshold. If so, the actions continue at block 830; otherwise, the actions continue at block 835. At block 830, A is increased. A may be increased by a greater or lesser amount depending on how much greater R_InsideA is than R_OutsideA plus the threshold. Doing so may help A converge with fewer iterations. One exemplary threshold of an exemplary embodiment dealing with 16 bit images uses a threshold of 500. This threshold corresponds to slightly more than 1 gray scale level in the image (if 256 gray scale levels are available). In practice, the threshold may be larger than the noise floor of an implementation. Other thresholds may be obtained for other implementations based on the characteristics of the implementations.

At block 835, a determination is made as to whether R_InsideA is less than R_OutsideA minus a threshold. If so, the actions continue at block 840; otherwise, the action continue at block 845. At block 840, A is decreased. A may be decreased by a greater or lesser amount depending on how much greater R_OutsideA minus the threshold is than R_InsideA. Doing so may help A converge with fewer iterations.

At block 845, L is adjusted if needed. L may increase as A increases. If the InOutAve is less than a threshold, L may be decreased. If the InOutAve is greater than a threshold, L may be increased. If L is adjusted to be less than a minimum value, L may be set to the minimum value. In an embodiment having a 16 bit grey scale image, L may be increased or decreased by 0.025 each time it is adjusted.

Figure 9:
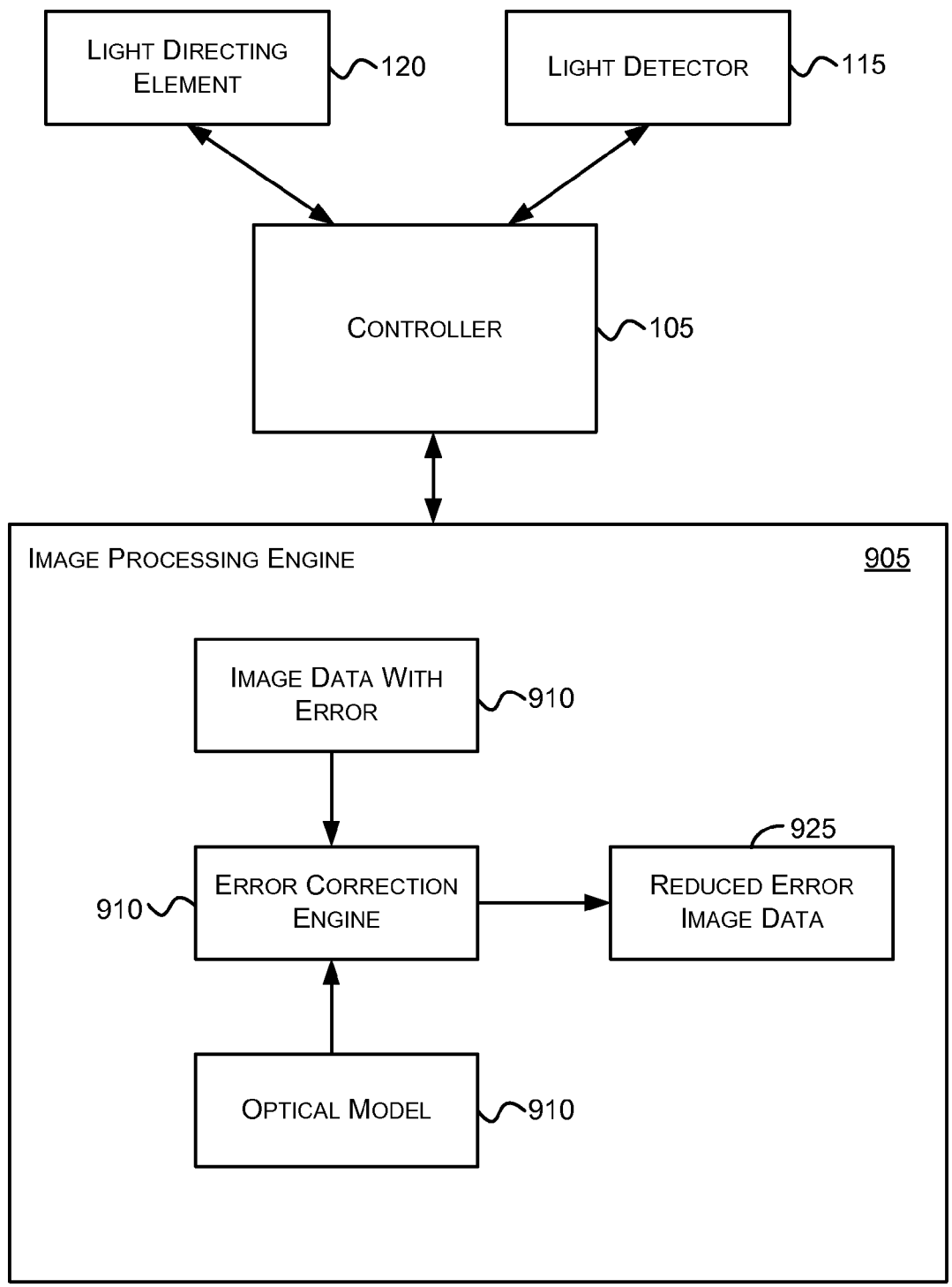
FIG. 9 is a block diagram that generally represents components of an exemplary system according to an embodiment.

FIG. 9 is a block diagram that generally represents components of an exemplary system according to an embodiment. The system includes a light directing element 120, a light source (not shown), a light detector 115, a controller 105, and an image processing engine 905. The image processing engine 905 includes memory that stores image data with error 910, an optical model 910, and a reduced error image data 725. The image processing engine 905 also includes an error correction engine 910 arranged to correct the image data with error 910.

In an embodiment, the error correction engine 910 may be arranged to perform actions associated with FIGS. 6-8 and may use information associated with the optical model 910 to reduce error. In another embodiment, the error correction engine 910 may be arranged to perform actions corresponding to another optical model depending on the optical characteristics of the system. In yet another embodiment, the error correction engine 910 may be arranged to smooth, sharpen, brighten, or darken images in reducing error.

It will also be recognized that a third, fourth, and additional paths may be separated from the B term and modeled to obtain better accuracy. Modeling these paths may be done with additional functions that may vary based on x and y. Performing calculations based on these additional paths may benefit from specialized components (e.g., ASICs, parallel processors, other hardware, and the like) for time-constrained applications (e.g., live video).

The error introduced by the scanned-beam system may also be reduced by modifying physical characteristics of the scanned-beam system. In an embodiment, error may be reduced by applying an anti-reflective coating on the lens, shaping the lens and other optical elements according to lower tolerances, designing the lens and other optical elements to reduce secondary and greater reflections, and the like. This may reduce or eliminate light that travels in paths other than the primary path.

In another embodiment, a light absorbing layer may be added to the surface surrounding the light directing element. This may reduce or eliminate light that reflects from the surface.

The foregoing detailed description has set forth aspects of the subject matter described herein via the use of block diagrams, flow diagrams, or examples. Insofar as such block diagrams, flow diagrams, or examples are associated with one or more actions, functions, or operations, it will be understood by those within the art that each action, function, or operation or set of actions, functions, or operations associated with such block diagrams, flowcharts, or examples may be implemented, individually or collectively, by a wide range of hardware, software, firmware, or virtually any combination thereof. In an embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will also recognize that aspects of the subject matter described herein, in whole or in part, may be equivalently implemented in standard integrated circuits, as one or more computer programs running on one or more computers, as one or more programs running on one or more processors, as firmware, or as virtually any combination thereof, and that designing the circuitry or writing the code for the software and or firmware would be well within the skill of one of skill in the art in light of this disclosure. In addition, those skilled in the art will appreciate that aspects of the subject matter described herein are capable of being distributed as a program product in a variety of forms, and that an illustrative embodiment of the subject matter described herein applies equally regardless of the particular type of machine-readable media used to actually carry out the distribution.

In a general sense, those skilled in the art will recognize that aspects described herein which may be implemented, individually or collectively, by a wide range of hardware, software, firmware, or any combination thereof may be viewed as being composed of various types of "circuitry." Consequently, as used herein "circuitry" includes electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out aspects of the subject matter described herein, or a microprocessor configured by a computer program which at least partially carries out aspects of the subject matter described herein), electrical circuitry forming a memory device (e.g., forms of random access memory), electrical circuitry forming a communications device (e.g., a modem, communications switch, or optical-electrical equipment), optical circuitry able to perform all or a part of the operations described above, any combination of the above, and the like.

As can be seen from the foregoing detailed description, there is provided aspects for reducing error in images. While the subject matter described herein is susceptible to various modifications and alternative constructions, certain illustrated embodiments thereof are shown in the drawings and have been described above in detail. It should be understood, however, that there is no intention to limit the claimed subject matter to the specific aspects described herein, but on the contrary, the intention is to cover all modifications, alternative constructions, and equivalents falling within the spirit and scope of the subject matter described herein.

What is claimed is:

1. A method, comprising:
    obtaining an image created by a scanned-beam system, wherein the scanned-beam system includes a light directing element, and wherein the image includes an error caused at least in part by light reflecting from the light directing element or its surroundings;
    reducing the error by adjusting values associated with an optical model of the scanned-beam system.

2. The method of claim 1, wherein a first of the values is associated with error caused at least in part by light that reflects twice from the light directing element.

3. The method of claim 1, wherein a second of the values is associated with error caused at least in part by light that reflects from the surroundings of the light directing element.

4. The method of claim 3, wherein the second of the values is also associated with error caused at least in part by light that reflects more than three times in creating the image.

5. The method of claim 1, further comprising calibrating the scanned-beam system to obtain a function of reflectivity of the light directing element.

6. The method of claim 5, wherein calibrating the scanned-beam system comprises capturing an image with the scanned-beam system of a white surface.

7. The method of claim 5, wherein calibrating the scanned-beam system comprises capturing a plurality of images with the scanned-beam system of a white surface and averaging the images together.

8. The method of claim 7, wherein capturing a plurality of images with the scanned-beam system of a white surface comprises capturing the images while the scanned-beam system is at different distances from the white surface.

9. A machine-readable medium having machine-executable instructions, which when executed perform actions, comprising:
    transmitting light via a light directing element of a scanned-beam system;
    receiving data from a light detector regarding at least a portion of the light including error introduced by the scanned-beam system; wherein the error comprises light traveling in paths other than a primary path; and
    reducing the error, wherein reducing the error comprises after detecting the at least a portion of the light, adjusting values of an equation that models the scanned-beam system to reduce the effects of the light traveling in paths other than the primary path.

10. An apparatus for obtaining images, comprising:
    a light directing element arranged to direct light to illuminate an area;
    a light detector arranged to detect light received at the light detector and to provide a signal in response thereto; and
    an error correction engine arranged to receive data corresponding to the signal and to reduce error in the data using an optical model that accounts for the light directing element, wherein the error corresponds to light that reflects more than once from the light directing element.

11. An apparatus for obtaining images, comprising:
    a light directing element arranged to direct light to illuminate an area;
    a light detector arranged to detect light received at the light detector and to provide a signal in response thereto; and
    an error correction engine arranged to receive data corresponding to the signal and to reduce error in the data using an optical model that accounts for the light directing element, wherein the optical model also accounts for area surrounding the light directing element and wherein the error corresponds to light that reflects from the area surrounding the light directing element.

12. An apparatus for obtaining images, comprising:
    a light directing element arranged to direct light to illuminate an area;
    a light detector arranged to detect light received at the light detector and to provide a signal in response thereto; and
    an error correction engine arranged to receive data corresponding to the signal and to reduce error in the data using an optical model that accounts for the light directing element, wherein using the optical model comprises comparing two areas of an image that corresponds to the data to determine whether brightnesses of the two areas are within a threshold of each other.

13. An apparatus for obtaining images, comprising:
    a light directing element arranged to direct light to illuminate an area;
    a light detector arranged to detect light received at the light detector and to provide a signal in response thereto; and
    an error correction engine arranged to receive data corresponding to the signal and to reduce error in the data using an optical model that accounts for the light directing element, wherein the error correction engine is further arranged to obtain calibration data associated with the light directing element, wherein the calibration data includes an image obtained by the apparatus at a distance from a white surface.

14. The apparatus of claim 13, wherein the error correction engine is further arranged to obtain calibration data associated with the light directing element, wherein the calibration data includes an average of images obtained by the apparatus at a plurality of distances from a white surface.

15. An apparatus for obtaining images, comprising:
    a light directing element arranged to direct light to illuminate an area;
    a light detector arranged to detect light received at the light detector and to provide a signal in response thereto; and
    correction means for reducing error in an image corresponding to the signal, wherein the correction means utilizes an optical model associated with the apparatus in reducing the error, wherein the optical model comprises reflectances of the light directing element and a surface surrounding the light directing element, wherein the reflectances are a function of position.

* * * * *